(12) United States Patent
Johannessen et al.

(10) Patent No.: US 9,010,091 B2
(45) Date of Patent: Apr. 21, 2015

(54) SYSTEM FOR STORING AMMONIA IN AND RELEASING AMMONIA FROM A STORAGE MATERIAL AND METHOD FOR STORING AND RELEASING AMMONIA

(75) Inventors: Tue Johannessen, Glostrup (DK); Henning Schmidt, Allerod (DK)

(73) Assignee: Amminex Emissions Technology A/S, Soborg (DK)

( * ) Notice: Subject to any disclaimer, the term of this patent is extended or adjusted under 35 U.S.C. 154(b) by 20 days.

(21) Appl. No.: 13/479,402

(22) Filed: May 24, 2012

(65) Prior Publication Data
US 2012/0288774 A1 Nov. 15, 2012

Related U.S. Application Data

(63) Continuation of application No. 12/557,895, filed on Sep. 11, 2009, now abandoned.

(60) Provisional application No. 60/908,987, filed on Mar. 30, 2008.

(30) Foreign Application Priority Data

Mar. 30, 2007 (EP) .................................. 07006706
Mar. 26, 2008 (WO) ................. PCT/EP2008/002386

(51) Int. Cl.
*F01N 3/00* (2006.01)
*B01D 53/90* (2006.01)
(Continued)

(52) U.S. Cl.
CPC ............ *B01D 53/90* (2013.01); *B01D 53/8631* (2013.01); *B01D 53/9431* (2013.01);
(Continued)

(58) Field of Classification Search
USPC ................................................... 60/272–324
See application file for complete search history.

(56) References Cited

U.S. PATENT DOCUMENTS

| | | | |
|---|---|---|---|
| 5,161,389 A | 11/1992 | Rockenfeller et al. | |
| 5,328,671 A | 7/1994 | Rockenfeller | |

(Continued)

FOREIGN PATENT DOCUMENTS

| | | |
|---|---|---|
| DE | 3422175 | 12/1985 |
| DE | 10323591 | 12/2004 |

(Continued)

OTHER PUBLICATIONS

International Search Report and Written Opinion dated Jul. 10, 2008 for Application No. PCT/EP2008/002386.
(Continued)

*Primary Examiner* — Jesse Bogue
(74) *Attorney, Agent, or Firm* — Frost Brown Todd LLC

(57) ABSTRACT

A system for storing ammonia in and releasing ammonia from a storage material capable of binding and releasing ammonia reversibly by adsorption or absorption for a process with a gradual ammonia demand that can vary over the time. The system has a container capable of housing the ammonia-containing storage material; a heating source arranged to supply heat for the desorption of ammonia from the solid storage medium; and a controller arranged to control the heating source to release ammonia. The heating source may be arranged inside the container and surrounded by ammonia storage material. A controllable dosing valve is arranged to dose released ammonia according to the ammonia demand. The controller comprises a feed-forward control arranged to control the heat supplied by the heating source, based on the ammonia demand.

16 Claims, 12 Drawing Sheets

(51) Int. Cl.
  *B01D 53/86* (2006.01)
  *B01D 53/94* (2006.01)
  *C01C 1/00* (2006.01)
  *F01N 3/20* (2006.01)

(52) U.S. Cl.
  CPC .... *B01D53/9495* (2013.01); *B01D 2251/2062* (2013.01); *C01C 1/006* (2013.01); *F01N 3/2066* (2013.01); *F01N 3/208* (2013.01); *F01N 2560/026* (2013.01); *F01N 2610/02* (2013.01); *F01N 2610/06* (2013.01); *F01N 2610/10* (2013.01); *F01N 2610/14* (2013.01); *F01N 2610/1406* (2013.01); *F01N 2610/146* (2013.01); *F01N 2900/0411* (2013.01); *F01N 2900/08* (2013.01); *F01N 2900/12* (2013.01); *F01N 2900/1808* (2013.01); *F01N 2900/1811* (2013.01); *Y02E 60/321* (2013.01); *Y02T 10/24* (2013.01)

(56) References Cited

U.S. PATENT DOCUMENTS

| | | | |
|---|---|---|---|
| 5,441,716 A | 8/1995 | Rockenfeller | |
| 5,809,775 A | 9/1998 | Tarabulski et al. | |
| 5,950,419 A | 9/1999 | Nishimura et al. | |
| 6,203,770 B1 | 3/2001 | Peter-Hoblyn et al. | |
| 6,266,955 B1 | 7/2001 | Liang et al. | |
| 6,387,336 B2 | 5/2002 | Marko et al. | |
| 6,725,651 B2 | 4/2004 | Itoh et al. | |
| 6,837,041 B2 | 1/2005 | Hernier | |
| 6,928,807 B2 | 8/2005 | Jacob et al. | |
| 8,015,801 B2* | 9/2011 | Oberski et al. | 60/286 |
| 8,578,702 B2* | 11/2013 | Johannessen et al. | 60/286 |
| 8,578,703 B2* | 11/2013 | Hirata et al. | 60/286 |
| 2005/0282285 A1* | 12/2005 | Radhamohan et al. | 436/55 |
| 2006/0117741 A1 | 6/2006 | Mayer et al. | |
| 2008/0279732 A1 | 11/2008 | Coates et al. | |
| 2010/0293927 A1* | 11/2010 | Johannessen et al. | 60/295 |

FOREIGN PATENT DOCUMENTS

| | | | | |
|---|---|---|---|---|
| JP | 02258017 | | 10/1990 | |
| JP | 2001042950 | | 2/2001 | |
| JP | 2006219987 | | 8/2006 | |
| JP | 2006219987 A | * | 8/2006 | ............... F01N 3/08 |
| WO | WO 94/11685 | | 5/1994 | |
| WO | WO 99/01205 | | 1/1999 | |
| WO | WO 2004/042207 | | 5/2004 | |
| WO | WO 2006/012903 | | 2/2006 | |
| WO | WO 2006/081824 | | 8/2006 | |
| WO | WO 2007/000170 | | 1/2007 | |

OTHER PUBLICATIONS

Abstract for German Application No. DE 3422175.
Abstract for German Application No. DE 10323591.
Abstract for Japanese Application No. JP 2001042950.
Abstract for Japanese Application No. JP 2006219987.

* cited by examiner

SYSTEM FOR STORING AMMONIA IN AND RELEASING AMMONIA FROM A STORAGE MATERIAL AND METHOD FOR STORING AND RELEASING AMMONIA

This application is based upon and claims priority from U.S. Provisional Patent Application Ser. No. 60/908,987, filed Mar. 30, 2008, and is a continuation of U.S. patent application Ser. No. 12/557,895, filed Sep. 11, 2009 now abandoned, both of which are incorporated herein by reference.

FIELD OF THE INVENTION

This invention relates to ammonia storage, and in particular to a system and method for storing ammonia in and releasing ammonia from a storage material capable of binding and releasing ammonia reversibly by adsorption or absorption.

BACK OF THE INVENTION

Metal ammine salts which are ammonia absorbing materials can be used as solid storage media for ammonia (see, e.g. WO 2006/012903), which in turn, for example, may be used as the reductant in selective catalytic reduction to reduce $NO_x$ emissions, see e.g. 1999/01205.

Usually, ammonia is released by thermal desorption, e.g. from metal ammine salts, by external heating of a storage container, see e.g. WO 1999/01205. The heating elements may also be placed inside the storage container, see e.g. U.S. Pat. No. 5,161,389 and WO 2006/012903.

WO 1999/01205 discloses the use of ammonia as the reductant in selective catalytic reduction to reduce $NO_x$ emissions of automotive vehicles. The ammonia is released from an either adsorptive or absorptive solid storage medium, among others $Sr(NH_3)_8Cl_2$ or $Ca(NH_3)_8Cl_2$ in granular form, in a storage container and temporarily stored as a gas in a buffer volume. The amount of ammonia to be supplied to a reaction volume in the vehicle's exhaust system is dosed under the control of an electronic engine controller according to the current operating state of the engine (WO 1999/01205, p. 9, last para.). The amount of ammonia to be desorbed from the storage medium is controlled by a feedback control in which the pressure in the storage container is measured by a pressure sensor, and if the pressure reaches a pressure threshold, the supply of heat is interrupted (WO 1999/01205, para. Bridging p. 8 and 9).

U.S. Pat. No. 5,441,716 describes a process for rapid absorption cycles (less than 30 minutes) using ammoniated metal halide salts for refrigerating purposes. A suitable reactor is described having one or more heat transfer tubes inside that are embedded in the storage material. Heat transfer plates are provided to increase the heat transfer from the heat transfer tube(s) into the surrounding storage material. The thermal diffusion path lengths and mass diffusion path lengths are less than 15 mm and 1.5 mm respectively. A similar reactor is described in U.S. Pat. No. 5,328,671.

SUMMARY OF THE INVENTION

A first aspect of the invention is directed to a system for storing ammonia in and releasing ammonia from a storage material capable of binding and releasing ammonia reversibly by adsorption or absorption for a process with a gradual ammonia demand that can vary over the time. The system comprises: a container capable of housing the ammonia-containing storage material; a heating source being arranged to supply heat for the desorption of ammonia from the solid storage medium; a controllable dosing valve arranged to dose released ammonia according to the ammonia demand; and a controller comprising a feed-forward control arranged to control the heat supplied by the heating source, based on the ammonia demand. The heat source may be arranged inside the container and surrounded by ammonia storage material.

According to another aspect, a method is provided of releasing ammonia storage by storage material housed in a container and capable of binding and releasing ammonia reversibly by adsorption or absorption for a process with a gradual ammonia demand that can vary over the time. The method comprises: determining how much heat is to be supplied to the ammonia storage material for the desorption of ammonia by means of a control comprising a feed-forward control, based on the ammonia demand; supplying the heat by a heating source; dosing released ammonia by means of a controllable dosing valve according to the ammonia demand. The heat source may be arranged inside the container and surrounded by ammonia storage material.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

DESCRIPTION OF EMBODIMENTS

Figure 1:
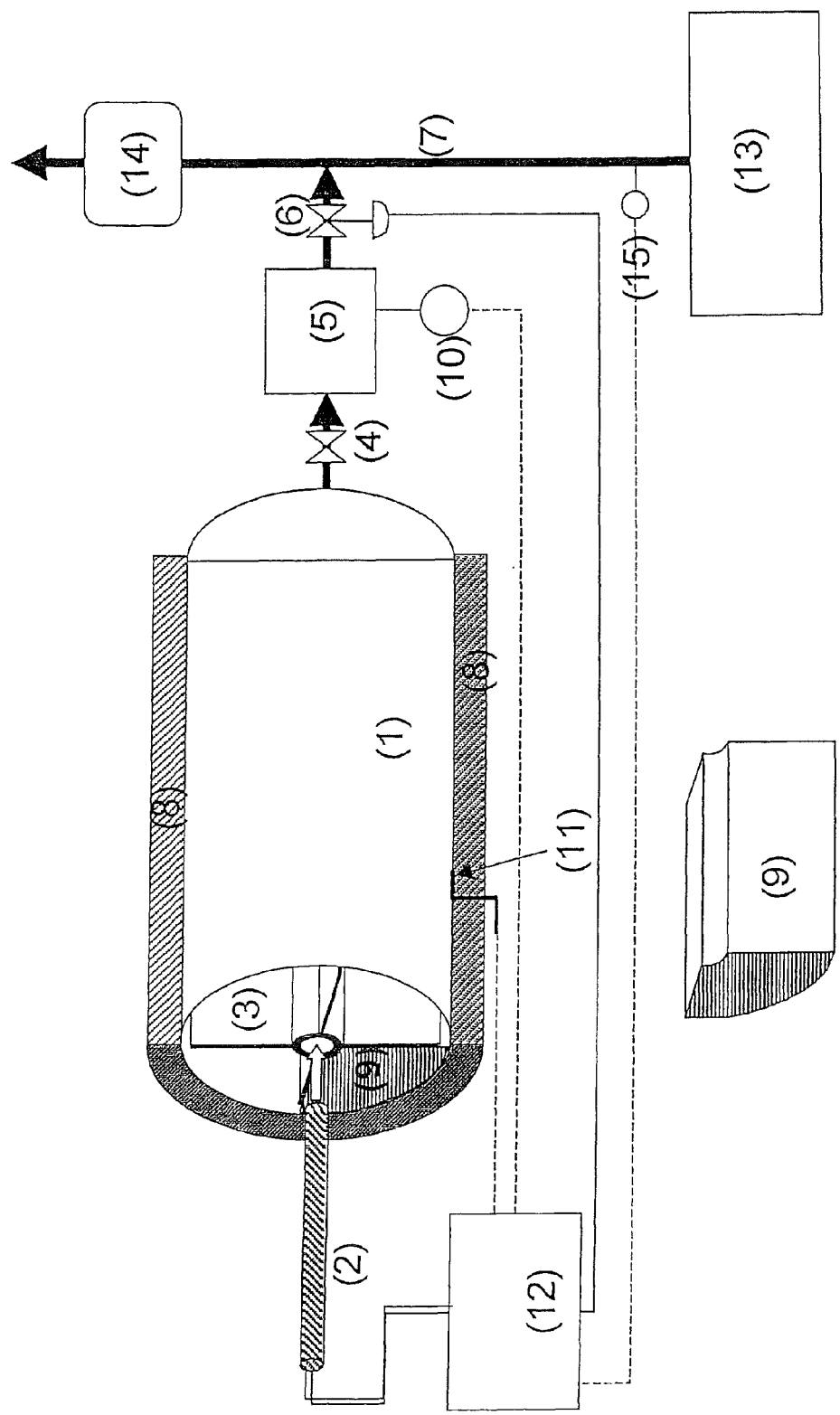
FIG. 1 shows an embodiment of an ammonia storage and release system with a storage container in which the ammonia storage material is heated internally and the heating source is embedded in the storage material, including a drawing of a suitable shape of an ammonia-containing storage material unit to be packed in the container.

The embodiments pertain to systems and methods for storing ammonia in and releasing ammonia from a storage material capable of binding and releasing ammonia reversibly by adsorption or absorption for a process with a gradual ammonia demand that can vary over the time. As described in applicant's co-pending application WO 2006/012903, metal ammine salts can be used as solid storage media for ammonia. Thus, the metal-ammine salt constitutes a solid storage medium for ammonia, which represent a safe and practical option for storage and transportation of ammonia. Ammonia is released by thermal desorption from the storage material.

"Gradual ammonia demand" means that the stored ammonia is not demanded all at once, but in a distributed way over an extended period of time (for example, over some hours) with a varying rate, or even intermittently. The ammonia-containing storage material is held in storage container from which, in some embodiments, the released ammonia is dosed through a controllable dosing valve in the desired proportion. Between the container and the valve, there is, in some embodiments, a buffer volume.

For mobile units, it is particularly useful to hold the storage material (e.g. metal ammine complex) in a container that can be easily separated from the mobile unit and replaced by a new metal ammine container or recharged with ammonia in-situ. In one embodiment of replacement of containers, the metal ammine containers are recycled and recharged with ammonia in a separate recharging unit or recharging facility.

In some embodiments, the desorbed ammonia is to be used as the reductant in a selective catalytic reduction to reduce $NO_x$ emissions, e.g. from automotive vehicles, boilers and furnaces. Thus, the system is arranged to remove $NO_x$ from an oxygen-containing exhaust gas of a combustion engine or combustion process. For example, in some of the embodiments, a feed line (which may include the buffer volume) is provided which is arranged to feed released gaseous ammonia from the container directly into the exhaust gas in the desired proportion, e.g. dosed by the controllable dosing valve. In a reaction volume in the exhaust system, a catalyst is provided for reducing $NO_x$ by reaction with the ammonia.

In some embodiments, the combustion engine is a mobile or immobile combustion engine unit fuelled by diesel, petrol, natural gas, coal, hydrogen or other fossil or synthetic fuel. The NOx to be removed may be produced by an automobile, truck, train, ship or other motorized machine or vehicle, or by a power plant for generating electricity.

The ammonia demand is substantially that amount of ammonia that is able to remove all the $NO_x$ in the exhaust gas; however, if it is not tolerable that any ammonia escapes to the atmosphere, a smaller proportion may be dosed into the exhaust gas to ensure that substantially all the ammonia is decomposed. In some embodiments, the ammonia demand is determined based on a measurement of the $NO_x$ in the exhaust gas, e.g. measured by a $NO_x$ sensor. In other embodiments, information from an engine controller or combustion process controller about the operating state is used to estimate the $NO_x$ expected in the present operating state. For example, the operating state may be defined by the current engine velocity, current load, current drive pedal position, etc.; knowing these parameters enables the engine controller (or combustion process controller) to determine in real-time the expected $NO_x$ in the exhaust gas. The engine controller is, for example, equipped with a mapping (e.g. in the form of a look-up table) of the entire engine operating area to the corresponding expected $NO_x$ emission. Such a real-time predicted $NO_x$ signal can be used as an input to the feed-forward controller to determine the ammonia demand. In some embodiments $NO_x$ measurement and $NO_x$ prediction, based on the engine controller, are combined in order to get a faster, but nevertheless precise, demand indication; for example, the $NO_x$ values predicted by the mapping (e.g. look-up table) can be compared with the actual (measured) $NO_x$, and the mapping can be continuously corrected should there be a discrepancy.

In other embodiments, the desorbed ammonia is to be used, directly or indirectly, as a fuel, e.g. for a power generating unit. For example, in some of these embodiments, the desorbed ammonia is used to produce hydrogen in a catalytic ammonia-cracking reactor, and the hydrogen is used as fuel in a fuel cell capable of operating on gaseous hydrogen. In other embodiments, a fuel for a fuel cell capable of operating on ammonia is directly operated with the desorbed ammonia. The gaseous ammonia is dosed into the ammonia-cracking reactor or directly into the fuel cell, e.g. by the controllable dosing valve.

In those embodiments, the ammonia demand is substantially that amount of ammonia that has to be provided to the reactor, or the fuel cell, so that the fuel cell is able to produce the power required.

The heat used in the thermal desorption of ammonia is provided by a heating source. In some embodiments, the heating source is arranged inside the container such that it is surrounded by, i.e. embedded in the ammonia storage material. Unlike a heating source arrangement outside the container or inside the container, but at the container wall, substantially all of the heat supplied has to enter the storage material. Thus, although a fraction of the heat is nevertheless lost to the environment, this fraction is smaller than the fraction that would be lost when the heating element were not embedded in the storage material.

The heat supply by the heating source is controlled by a controller. The amount of ammonia to be supplied, e.g. to a reaction volume in a vehicle's exhaust system, is, in some embodiments, dosed by a controlled valve based on the current ammonia demand, e.g. according to the current operating state of the engine. Since unloading of ammonia generally varies, there will be pressure variations in the storage container (if there is a buffer, the pressure variations will also be in the buffer). For example, according to WO 1999/01205 the amount of ammonia to be desorbed from the storage medium is controlled indirectly based on the pressure variations caused by unloading ammonia from the container, by a feedback control in which the pressure in the storage container is measured by a pressure sensor, and if the pressure reaches a pressure threshold, the supply of heat is interrupted. By contrast, in some of the embodiments of the present invention the controller comprises a feed-forward control arranged to control the heat supplied by the heating source, based on the ammonia demand. This, for example, is the current demand or an estimated future demand, or a combination of current and future demand. Since the feed-forward control does not only react if the pressure is already too small or too high, the delay with which the effective desorption rate is adapted to the rate with which ammonia is unloaded—which is generally a varying rate—is shortened.

The heat controller uses information regarding ammonia delivery demand and an estimated (model-based) heat loss from the container to ensure that the heating source at all times provides an amount of energy that does not allow the unit to cool down below a suitable operation temperature of the dynamic desorption process. Reaching too low operating temperature would result in a desorption pressure below the minimum pressure needed to dose ammonia into e.g. an exhaust line with a pressure slightly above atmospheric pressure.

Thus, the feed-forward control is not based on a measurement of how much ammonia has actually been released; rather the amount of heat required to release the demanded amount of ammonia is estimated, e.g. by a model calculation or by experimental data that links the amount of heat supplied to the resulting ammonia release. Since the accuracy of such an estimate may be limited, and since the effect of heating (or terminating the heating) may only appear after a certain delay, in some embodiments a feedback control is laid over the feed-forward control, as will be explained in more detail below.

In some of the embodiments, the feed-forward control cannot only simply switch on and off the heating source. Rather, the feed-forward control is able to adjust the heating source so that it also can supply intermediate amounts of heat flow between completely on and off; for example, it is able to adjust the heat flow to the continuous intermediate values in the range between on and off. In some embodiments, the heating source itself can be operated at different powers, e.g. by continuously regulating the heating current (in an electrically powered heating source) or the flow of hot liquid (in an hot fluid heating source). In other embodiments in which the heating source can only be operated at maximum power, by fast switching the heating source (e.g. switching the electric supply) with a duty cycle corresponding to the intermediate value required, an effective amount of heat corresponding to the intermediate value required is supplied, due to the thermal inertia of the heating system.

The desorption rate is a function of the temperature and the pressure in the storage container. To achieve, or maintain, a certain desorption rate one might therefore think of measuring the temperature, and start, or increase, the supply of heat if the temperature is too low, and stop, or decrease, the supply of heat if the temperature is too low. However, such a temperature based feedback control would have similar delays as the pressure-based feedback control described in WO 1999/01205.

Generally, the desorption of ammonia from the storage material is endothermic. Thus, desorbing ammonia has a cooling effect. In some embodiments, the feed-forward control is arranged to control the heat supplied by the heating source such that it compensates the energy required for the endothermic desorption of the demanded ammonia from the storage material. As explained above, this is not (primarily) based on a measurement of the temperature and a feedback control based on the measured temperature, but on a calculation (i.e. an estimation) of the endothermic desorption energy required for the desorption of the demanded amount. Since the desorption energy is proportional to the amount to be desorbed, the required heat energy is, in some embodiments, obtained by multiplying the ammonia demand by the proportionality factor.

Even though the heating source is embedded in the storage material, so that substantially all the heat is absorbed by the storage material, a certain fraction of the heat will be lost to the surroundings through the walls of the storage container. In some embodiments, this heat loss is taken into account in the feed-forward control. In these embodiments, the controller is arranged to determine the heat loss of the container to the surroundings, and the feed-forward control controls the heat supplied by the heating source such that it compensates the heat loss to the surroundings. For example, a simple method of estimating the heat loss is based on a model description of the (preferably insulated) storage container in terms of its external surface area (e.g. in $m^2$ that the heat has to get out of) and a heat transfer coefficient ($W/m^2K$) that is combined with a temperature gradient from inside the insulation to the outside. In some of the embodiments, the temperature gradient is taken as the difference between to actual measurements of the internal and external temperatures, or, for example, as the difference of an internal temperature measurement and an average temperature value of the surroundings.

In some embodiments, the feed-forward control is such that the heat supplied by the heating element corresponds to the sum of the desorption energy required to desorb the demanded amount of ammonia and the heat loss to the surroundings.

In some of the embodiments in which the heat loss to the surroundings is taken into account in the feed-forward control, the heat loss is estimated on the basis of a temperature measurement. In principle, to calculate the heat loss, the temperature inside the storage container (or at the inner side of the container wall) and the temperature of the surroundings (or at the outer side of the container wall) should be known. Thus, in some embodiments, both the temperature inside the storage container (or at the inner side of the container wall) and the temperature of the surroundings (or at the outer side of the container wall) are measured and used in the heat loss calculation. In other embodiments, only one temperature measurement is made, and for the other temperature a (constant) average temperature is assumed, and used in the calculation (the measured temperature may be the inner temperature, and the average temperature, the outer temperature, or vice versa). In still other embodiments, no temperature measurement is made, and for both the outer and the inner temperature temperatures average values are used.

As mentioned above, in some embodiments a feedback control is laid over the feed-forward control of the heat supply. The overlaid feedback control is based on a pressure measurement in the container. It reduces or terminates the supply of heat by the heating source when the pressure is above an upper pressure threshold, and increases or starts the supply of heat by the heating source when the pressure is below a lower pressure threshold. In some embodiments, at overpressure the heat supply is completely switched off, and at underpressure the maximum heat rate available is supplied. There are generally two reasons why an overlaid feedback control may be useful:

(i) As explained, the feed-forward control is based on an estimate of the heat required to desorb the demanded amount of ammonia; since the accuracy of such an estimate may be limited, and errors in the estimation may accumulate over time, the overlaid feedback control provides a sort of error-correction functionality; and (ii) since the effect of heating (or terminating heating) may only appear after a certain delay, and the demand can suddenly significantly increase or decrease, it may happen that the pressure in the storage container exceptionally undershoots or overshoots an upper or lower pressure limit.

The overlaid feedback control corrects an accumulated error of the feed-forward control and constitutes a sort of "emergency intervention" in the case where the pressure becomes too high or low.

The system and process presented here can be used with all storage materials capable of reversibly releasing ammonia by thermal desorption. These materials may be ammonia adsorbing or absorbing materials. Examples of adsorbing materials are carbon modified with an acid, and zeolites. Examples of absorbing materials are metal ammine salts.

Useful metal ammine salts have the general formula $M(NH_3)_nX_z$, where M is one or more metal ions capable of binding ammonia, such as Li, Mg, Ca, Sr, V, Cr, Mn, Fe, Co, Ni, Cu, Zn, etc., n is the coordination number usually 2-12, and X is one or more anions, depending on the valence of M, where representative examples of X are F, Cl, Br, I, $SO_4$, $MoO_4$, $PO_4$ etc.

During release of ammonia, the original metal ammine salt $M(NH_3)_nX_z$ is gradually transformed into $M(NH_3)_mX_z$ with m<n. When all the desired ammonia has been released, the resulting $M(NH_3)_mX_x$ can usually be converted back into $M(NH_3)_nX_z$ by an absorption treatment with an ammonia-containing gas stream due to reversibility of the absorption/desorption process. For several metal ammine salts it is possible to release all ammonia salt in a large number of cycles.

Typical ammonia contents of the metal ammine complexes are in the range of 20-60 wt %, preferably above 30 wt %. As an example, a typical and inexpensive compound, such as $Mg(NH_3)_6Cl_2$, contains 51.7 wt % ammonia. Using a compaction method such as the one disclosed in applicant's copending application WO 2006/081824 it is possible to obtain an ammonia density within a few percent of liquid ammonia (8-9 bar pressure vessel).

The use of applicant's technology disclosed in WO 2006/081824 enables storage of ammonia at significantly higher densities (both on a volume and a weight basis) than both aqueous ammonia and aqueous urea solutions. Aqueous urea is an example of a chemical ammonia carrier that may provide ammonia for removal of $NO_x$ by using a catalyst for $NO_x$ reduction and generated ammonia as the reductant.

It is an advantage to deliver ammonia directly in the form of a gas, both for the simplicity of the flow control system and for an efficient mixing of reducing agent, ammonia, with the exhaust gas. The direct use of ammonia also eliminates potential difficulties related to blocking of the dosing system which are caused by precipitation or impurities e.g. in a liquid-based urea system. In addition, an aqueous urea solution cannot be dosed at a low engine load since the temperature of the exhaust line would be too low for complete conversion of urea to ammonia (and $CO_2$).

The arrangement of the heating embedded in the storage material is in a functional relationship with the feed-forward control of the heat supply because it enables the estimation of the heat to be supplied as a function of the ammonia demand to be made with better precision. Although this relationship is not mandatory, it is advantageous for the feed-forward control.

To improve the heat transfer from the embedded heating source to the storage material, in some embodiments heat conducting elements are provided that are in thermal connection with the heating source and ammonia storage material to increase the internal heat exchanging area between the heating source and ammonia-containing storage material.

For example, the heat conducting elements are fins thermally connected to the heating source and surrounded by ammonia-containing storage material. In some embodiments at least some of the heat conducting elements are constructed of a porous metal structure that passes released ammonia from the surface of the storage material being in contact to the fin.

For example, the heat-conducting elements are made of porous or dense aluminum, titanium, stainless steel or similar ammonia resistant metals or alloys. An example of a suitable metal for the heat conducting elements is aluminum, which is able to tolerate ammonia and salt—unlike e.g. brass. Furthermore, aluminum has a low mass density and excellent thermal conductivity and is thus preferred for efficiently conducting the thermal energy from the heating element or heating source to the surrounding storage material kept in the container.

In some of the embodiments, the heating source has a oblong shape. For example, the fins are arranged parallel to the heating source's longitudinal direction. However, in other embodiments, they are arranged perpendicularly to the heating source's longitudinal direction.

In the latter embodiments, if the desorbed ammonia is to be drawn off at one (or both) of the longitudinal ends of the storage container, the fins could, in principle, be an obstacle to the gas flow (if there is, for example, no other way for the gas to flow around the fins).

In some embodiments, some, or all, of the heat-conducting elements are constructed of a porous metal structure that passes released ammonia from the surface of the storage material being in contact to the fin. This is not only reasonable in the case of fins that could otherwise be an obstacle to the gas flow, but it may also be useful, e.g. with longitudinal fins, to present "channels" within the storage material for the desorbed gas to facilitate the gas leaving the storage material.

The heat conducting metal may be made of porous metal plates. Porous metal sheets/plates/bodies, for example, made of partially sintered metal grains will be efficient for heat conduction from the heating element (heating source) to the storage material as well as giving increased gas transport channels from the storage material to the container exit by allowing ammonia to flow through the porosity of the heating fins. The porosity of the heating fins should be limited so that the heat conductivity of the porous metal is at least 10% of the conductivity of the compact metal.

In some of the embodiments, the maximum heat diffusion path length (the distance from a highly thermally conductive surface to the point of the storage material farthest away from any highly conductive surface) is above 15 mm. In some embodiments the mean mass diffusion path length (the arithmetic mean over all ammonia molecules of the shortest distance from every ammonia molecule to a gas permeable surface bordering the ammonia storage material) is also above 15 mm.

In some embodiments, the heating element is arranged to be powered with electrical current to produce heat. The heating source may comprise a heat exchanger (or a plurality of heat exchangers) extending into the container. The heat can be obtained from a hot fluid or gas passing through the heat exchanger. In some embodiments, the hot fluid or gas is, or is heated by, a hot product gas or fluid from a chemical reaction or a combustion process. In some embodiments the heating source is provided in the form of one or more heating tubes. The container may have a longitudinal extension, and the heating tube or tubes extend(s) in the direction of the container's longitudinal extension.

Thus, this invention relates to the use of storage materials capable of binding ammonia by ad- or absorption for the storage and generation of ammonia. For example, solid metal ammine complexes for storage of ammonia and for release of ammonia from the material using controlled internal delivery of desorption heat directly inside a storage container can be used. The release of ammonia may be further facilitated by internal gas channels in the heat exchanging material by using porous metal structures. Upon release, ammonia may be used as the reducing agent in selective catalytic reduction (SCR) of $NO_x$ in exhaust gases from combustion processes.

Other applications using ammonia in mobile or portable units or in special chemical synthesis routes where storage of liquid ammonia is too hazardous are also considered embodiments of the present invention. This also includes fuel cell systems where ammonia may be considered an efficient hydrogen carrier as well as other processes consuming ammonia including chemical synthesis routes involving ammonia where storage of ammonia as liquid ammonia is not allowed for safety reasons.

The thermal time response of the heated storage medium is, in most instances, too slow to fit the ammonia demand in real time (i.e. nearly instantaneously). To fit the ammonia demand in real time, the controllable dosing valve is provided; it determines the amount of ammonia actually dosed to the outside (e.g. into the exhaust gas).

I some embodiments, the controllable dosing valve is controlled to dose released ammonia according to the ammonia demand. For example, the feed-forward ammonia-demand signal produced by the controller is used to control both the controllable dosing valve and the heating source. Although the response of the thermal ammonia release is relatively fast due to the feed-forward control of the heating source (compared with feed-back control schemes), it is still relatively slow compared with the nearly instantaneous dosing response by the dosing valve. As a consequence, the amount of ammonia released and the amount dosed may differ from each other at certain instances of time. However, if the same demand signal is used for both the thermal ammonia release and released ammonia dosing, these amounts will become equal, due to an averaging effect, on a time scale comparable to the time constant of the thermal-ammonia-release-by-heating mechanism (assuming that the calibration of both processes is correct).

As the ammonia amount released instantly not always equals the amount dosed, the pressure in the container housing the ammonia-containing storage material may vary. In order to ensure that the demanded ammonia amount is precisely dosed also in view of varying pressures, in some embodiments the demand signal does not directly adjust the controllable dosing valve, but only indirectly, thereby also relying on a mass flow meter that measure the actual mass flow of ammonia dosed by the dosing valve. A controller (which may be the controller mentioned above, or a dedicated mass flow controller) compares the ammonia demand and the measured actual mass flow and, based on this comparison, controls the controllable dosing valve such that the measured mass flow matches the ammonia demand prescribed by the feed-forward ammonia demand signal.

In some of the embodiments with an overlaid feedback control of the heating source to avoid over- and underpressures, the feedback control signal is only used to control the heating sources, but it is not used in control of the dosing valve. Thus, in such embodiments, the control valve is always controlled only on the basis of the feed-forward demand signal, without overlaid feedback signal, while the feed-forward demand signal also used for the control of the heating source may be overlaid with the feedback signal. This ensures that the actually dosed ammonia amount always matches with the demand as close as possible, while under- and overpressures due to the above-mentioned greater time constant of the thermal-ammonia-release-by-heating mechanism, and possibly due to calibration mismatch of thermal desorption and dosing, are avoided.

The embodiments do not only pertain to system (i.e. product), but also to a method of releasing ammonia stored by storage material housed in a container and capable of binding and releasing ammonia reversibly by adsorption or absorption for a process with a gradual ammonia demand that can vary over the time. The method comprises: determining how much heat is to be supplied to the ammonia storage material for the desorption of ammonia by means of a control comprising a feed-forward control, based on the ammonia demand; supplying the heat by a heating source arranged inside the container and surrounded by the ammonia storage material; dosing released ammonia by means of a controllable dosing valve according to the ammonia demand.

In some embodiments of the method, the desorption of ammonia from the storage material is endothermic, and the feed-forward control controls the heat supplied by the heating source such that it compensates the energy required for the endothermic desorption of the demanded ammonia from the storage material.

In some embodiments of the method, the control determines a heat loss of the container to the surroundings, and the feed-forward control controls the heat supplied by the heating source such that it compensates the heat loss to the surroundings. In some of these embodiments, the heat loss to the surroundings is estimated on the basis of a measurement of at least one of the temperature inside the container, the temperature of an inner side of a container wall, the temperature of an outer side of a container wall, and the temperature of the surroundings.

In some embodiments of the method, the feed-forward control controls the heat supplied by the heating source such that it compensates both the energy required for the endothermic desorption of the demanded ammonia from the storage material, and the heat loss to the surroundings.

In some embodiments of the method, the control comprises an overlaid feedback control that, based on a pressure measurement in the container, reduces or terminates the supply of heat by the heating source when the pressure is above an upper pressure threshold and increases or starts the supply of heat by the heating source when the pressure is below a lower pressure threshold.

In some embodiments of the method, $NO_x$ is removed from an oxygen-containing exhaust gas of a combustion engine or combustion process by feeding released gaseous ammonia from the container into the exhaust gas, and reducing $NO_x$ reaction with the ammonia using a catalyst, wherein the control obtains the ammonia demand based on at least one (i) a measurement or estimate of the $NO_x$, and (ii) information from an engine controller or combustion process controller. In some of these embodiments, the information from the engine controller indicates the engine's operational state, and the feed-forward control estimates the ammonia demand based on the operational state information.

In some embodiments of the method, the desorbed ammonia is used as a fuel for a power generating unit.

In some embodiments of the method, (a) the desorbed ammonia is used to produce hydrogen in a catalytic ammonia cracking reactor, and the hydrogen is used as fuel in a fuel cell capable of operating on gaseous hydrogen; or (b) a fuel cell capable of operating on ammonia is operated directly with the desorbed ammonia.

Turning now to FIG. 1, the storage container 1 is heated by a heating element 2 representing a heating source placed inside the container 1. In order to dissipate the heat from the heating element 2 there are fins 3 representing heat-conducting elements attached to the heating element 2. In the example shown, the heating element is powered by electric current. The fins 3 are arranged in planes defined by the longitudinal direction of the container 1 (i.e. along its cylinder axis) and the container's radial direction. They are suitably made of aluminum or other light materials with high heat conductivity and resistance to the environment in the container 1. The ammonia storage material is made in shape of blocks 9 to fill out the void in the container 1 (or, in other embodiments, may be put into the unit as powder). The storage material 9 is shown both separately and inside the container 1—both places indicated by item 9. When ammonia is released from the solid by thermal desorption, it passes through a tube with an on/off valve 4 to a buffer volume 5. A pressure sensor 10 measures the ammonia desorption pressure and a dosing valve 6 doses ammonia into an exhaust line 7 according to the demand given by a controller 12. The controller 12, for example, communicates with an engine control unit (ECU; not shown here). An $NO_x$ sensor 15 is provided in the exhaust line 7 that delivers an $NO_x$ signal to the controller 12 which, in turns, calculates the ammonia demand to remove the $NO_x$. In other embodiments, the controller 12 gets a predicted ammonia-demand signal from the ECU.

The storage container 1 is insulated by a thermal insulation 8; it also has means for measuring the temperature 11 on the outside of the container 1 but underneath the insulation material 8. The controller 12 uses the signal from the temperature measurement 11 to estimate/predict the heat loss through the insulation material. Since most of the temperature gradient appears at the insulation material 8, this temperature measurement approximately corresponds to the higher temperature level to be used in the heat loss estimation made by the controller 12. The lower temperature level to be used in the heat loss estimation is, in some embodiments, measured by a second sensor, e.g. at the outer surface of the insulation material 8; in other embodiments a constant average outside temperature is simple assumed. In some embodiments the heating element itself is constructed with a built-in thermocouple. This may serve both as a security for avoiding overheating of the heating element and the temperature measurement may also be used as a parameter in the prediction of the temperature gradient.

This heat loss estimation, combined with the demand to release ammonia, controls the heating input to the heating element 2, in a feed-forward manner. Of course, it is actually not necessary to calculate the amount of heat needed to compensate the desorption energy in a two-step procedure, in which first the ammonia demand is calculated, and then the heat required to compensate the desorption energy for this demand is calculated. Thus, in some embodiments, the (measured or predicted) $NO_x$ is directly mapped to a number indicating the heat required to compensate the desorption energy for the amount of ammonia to be released to remove the measured or predicted $NO_x$, by a suitable mapping table or formula. This heat may then directly be combined with the estimated heat loss to obtain the amount of heat to be produced by the heating element 2.

Based on the result of determination, the controller controls the electric energy delivered to the heat element 2 such that the required amount of heat is produced by the heat element 2. For example, it is able to vary the voltage and/or current in a continuous manner, according to the need. In other embodiments, the supply to the heating element 2 is permanently switched on and off, with a duty cycle corresponding to the amount of heat required.

The $NO_x$-containing exhaust gas is produced by a combustion engine or burner, eg. An internal combustion engine 13, and emitted into the exhaust line 7. The $NO_x$ sensor 15 is arranged downstream in the exhaust line 7. Further downstream the ammonia, dosed by the dosing valve 6, is discharged into the exhaust line 7. Still further downstream is an exhaust chamber housing an $NO_x$ reduction catalyst 14 capable of removing $NO_x$ by reaction with ammonia. The ammonia is dosed such by the dosing valve 6 that the dosed amount is just sufficient to remove the current (measured or predicted) $NO_x$ in the exhaust gas, without any significant amount of ammonia being emitted to the atmosphere.

To this end, in some embodiments the ammonia demand signal (based on calculation or prediction by the controller 12, as described above) is also used to control the controllable dosing valve such that it doses the released ammonia according to the ammonia demand.

Figure 2:
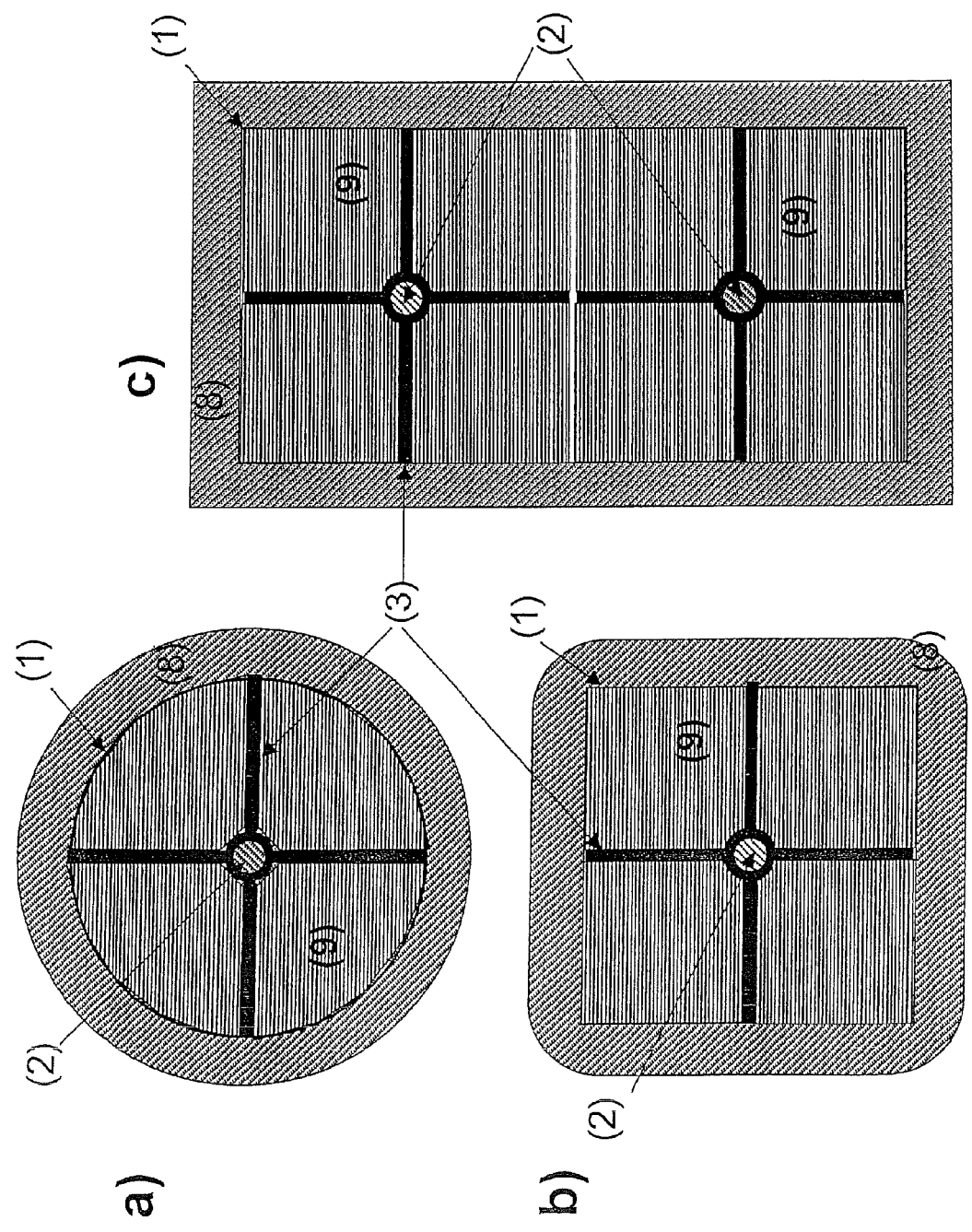
FIG. 2 shows different embodiments in cross-section views of storage containers in which the heating source is equipped with heat conducting elements wherein FIG. 2a corresponds to the storage container of FIG. 1.

FIG. 2 shows different alternatives (a to c) of applying the concept of internal embedded heating of the storage material 9 with large material length scales (the latter will be explained in connection with FIG. 6):

a) The heating element 2 in form of a rod is placed in the middle axis of the container 1, here a cylindrically shaped container. Four storage blocks 9 are placed in the container 1. The heating fins 3 conduct the heat from the heating element 2 to the storage blocks 9. The container 1 is thermally insulated by means of the insulation 8.

b) The heating element 2 is placed in the middle axis of the container 1 which is here a rectangular shaped container. Again, four storage blocks 9 are placed in the container 1, and the heating fins 3 conduct the heat from the heating element 2 to the storage blocks 9. The container 1 is insulated, at 8.

c) Two heating elements 2 are placed inside a rectangular shaped container 1. Eight storage blocks 9 are now placed in the container 1. Again, the heating fins 3 conduct the heat from the heating element 2 to the storage blocks 9, and the unit is insulated at 8. Using two internal heating zones may be an advantage for fast start-up with reduced power demand.

Figure 3:
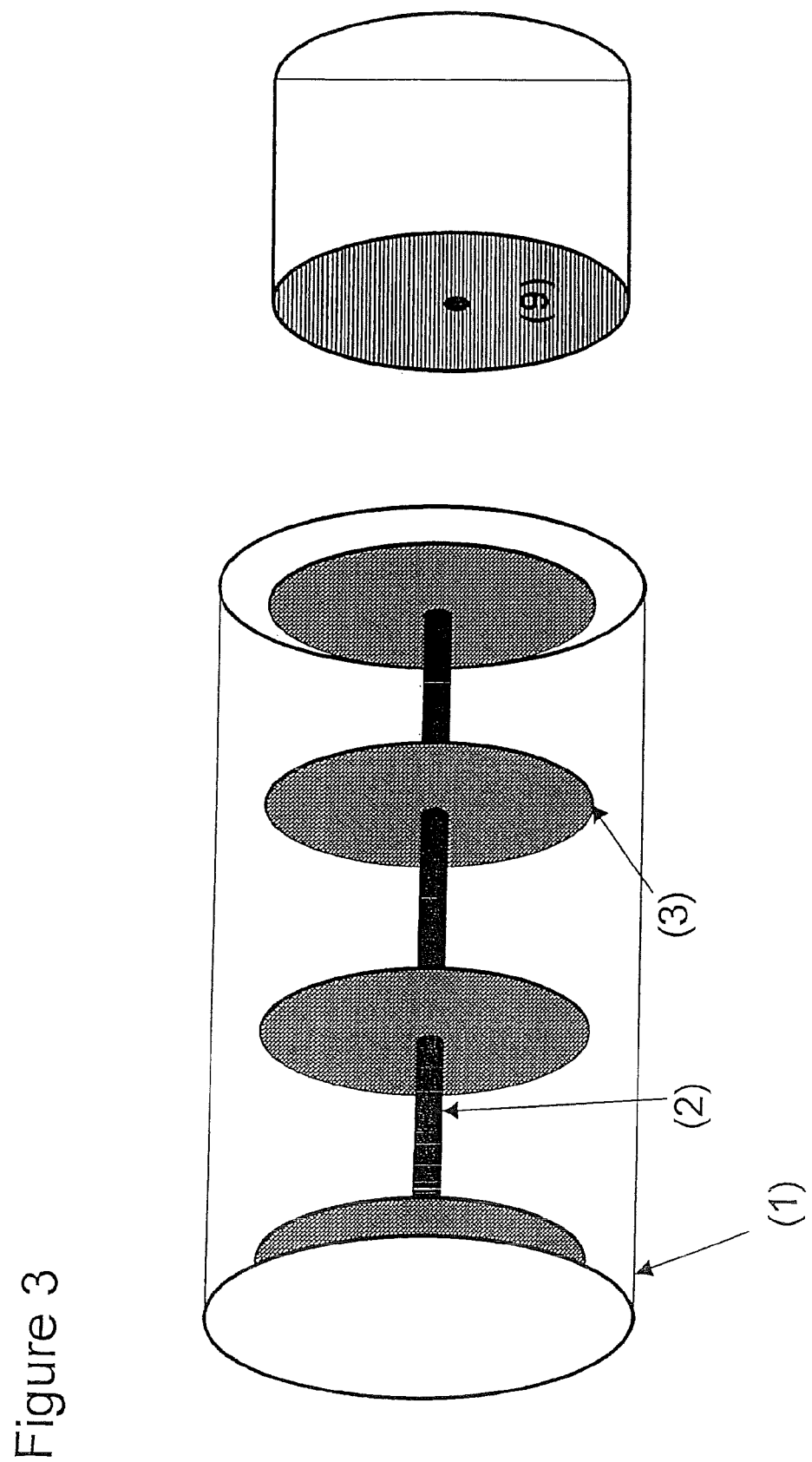
FIG. 3 shows an embodiment in which the heat conducting elements, in the form of fins, are circular plates arranged along an axis of the heating source, including a drawing of suitable shape of an ammonia-containing storage material unit to be packed in the container.

FIG. 3 shows another embodiment in which the internal embedded heating is arranged in a cylindrical container 1 with heating element on the cylinder axis 2 and heating fins 3 of a disc-like shape and arranged perpendicularly to the container's cylinder axis. In this configuration, blocks 9 are, for example, of cylindrical shape with a central hole in order to fit on the heating rod 2.

In some embodiments, the heating rod 2 has separate internal heating zones, or "sections", and each heating disc (or fin) 3 may dissipate energy to one section (or two neighboured sections) while another zone is not heated. This can be an advantage, e.g. when lower power consumption is desired during start-up, as the system has an ability to direct more energy locally to reach a desired desorption pressure without heating the entire storage mass.

Figure 4:
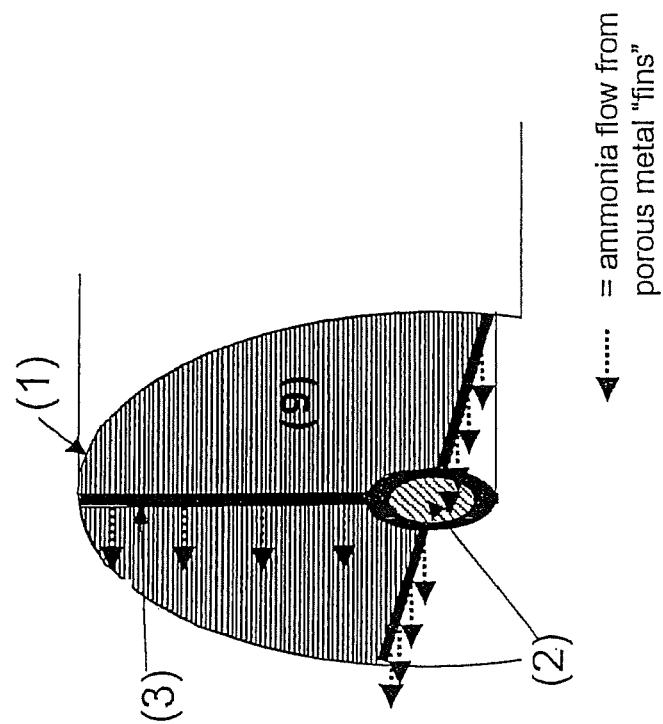
FIG. 4 shows an embodiment in which the heat conducting fins are made of porous metal plates to enable desorbed ammonia to flow in the fins towards the exit of the storage container without passing through entire blocks of storage material.

FIG. 4 shows a particular configuration in which heating rod 2 is provided with porous metal sheets acting as heating fins 3, attached to the heating rod 2 along the longitudinal direction, similar to FIGS. 1 and 2. The ammonia released from the storage blocks 9 can then flow in the container's longitudinal direction through the porous metal sheets 3 which may provide faster ammonia release. The heating rod 2 may dissipate the heat through conduction in the porous metal sheet 3. The porosity of the e.g. sintered metal sheet is below 90% as otherwise the heat conductivity could be too low. In other embodiments, perpendicularly arranged fins, as in FIG. 3, are made of porous metal.

Figure 5:
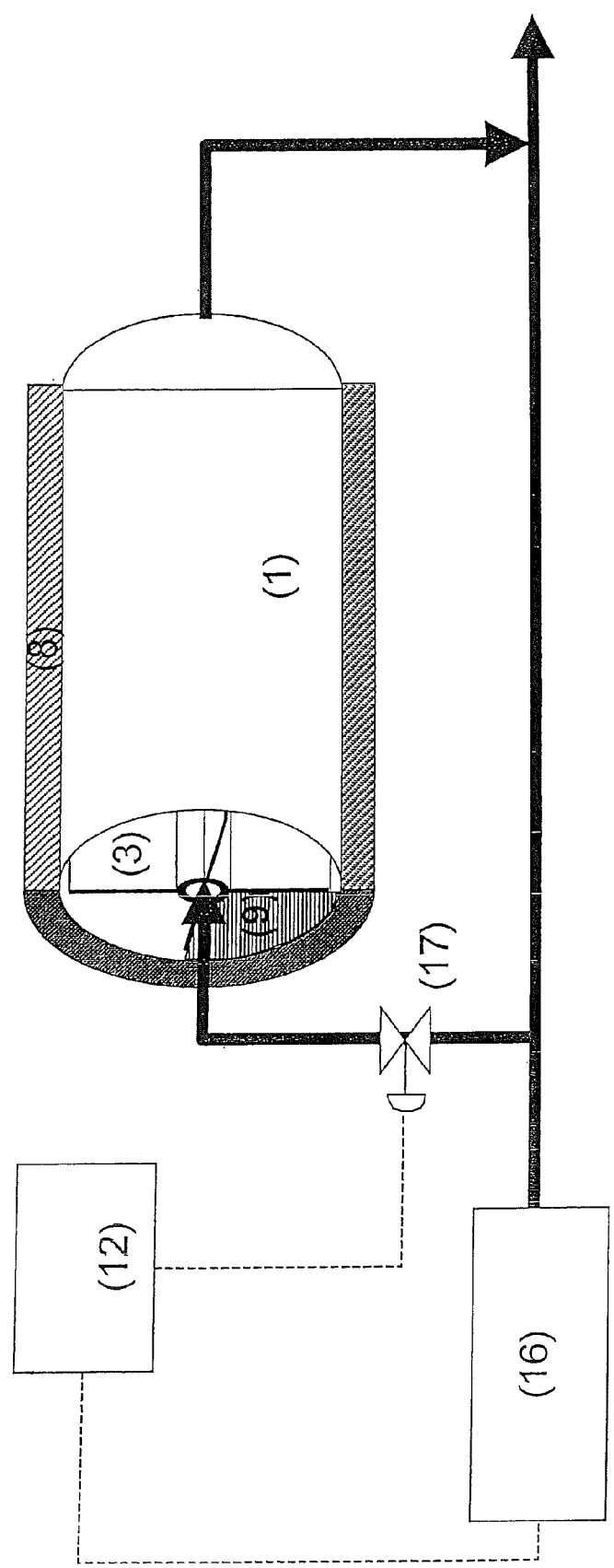
FIG. 5 shows an embodiment similar to FIG. 1, but with a heating source supplied with a hot fluid as a heating medium.
Figure 6:
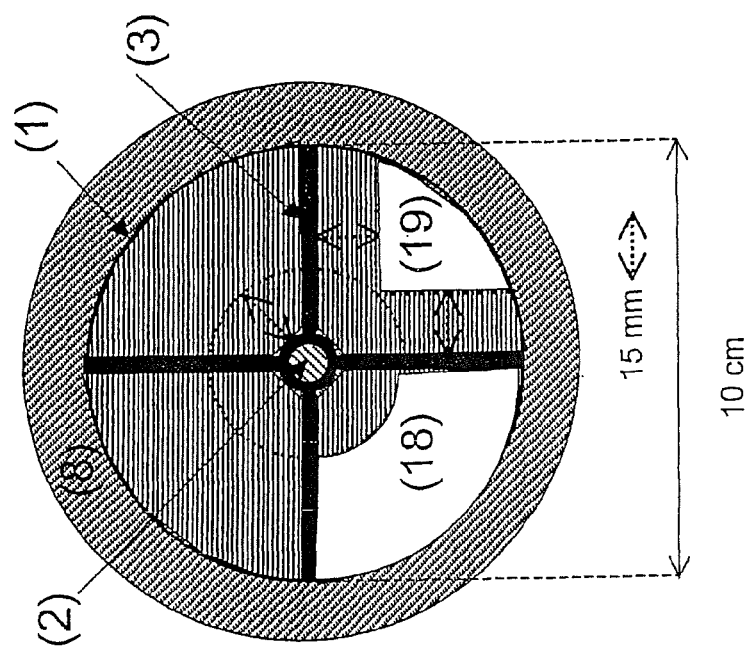
FIG. 6 illustrates the notion of a maximum heat diffusion path length, based on cross-sectional view of the storage container of FIG. 1.

FIG. 5 shows an embodiment similar to FIG. 1, but with a heat exchanger as the heat element 2. A hot fluid acting as a heating medium is flowed through a central bore in the heating element 2. The heating medium conveys some of its heat to the surrounding heat element 2, due to heat conduction. The heating medium is, for example, heated by waste heat produced by an engine (or a burner or chemical reaction chamber etc.) 16. A continuously regulable valve 17 arranged in the heating-medium circuit is controlled by the controller 12 to adjust (i.e. vary) the flow of the heating medium in such a manner that the heating medium conveys the amount of heat required to the heat element 2. FIG. 6 illustrates what is meant by the maximum heat diffusion path length, based on cross-sectional view of the storage container of FIG. 1. In the example shown, the container 1 is a cylinder having a circular cross section with an inner diameter of 10 cm (100 mm). The storage material placed in the range of distances in which the distance to the central heat element 2, i.e. is greater than 15 mm is shown as a white area at 18 (at the lower left quarter in FIG. 6). Taking also the heat conducting elements 3 into account, the storage material placed in the range of distances in which the distance to nearest hot surface (central heating element 2 or heat conducting element 3) is greater than 15 mm is shown as a white area at 19 (at the lower right quarter in FIG. 6). The latter distance is the "heat diffusion path length". By contrast, in the shaded area of the lower right quarter in FIG. 6, the heat diffusion path length is smaller than 15 mm. The maximum of the heat diffusion path length that appears somewhere in the container 2 is called the "maximum heat diffusion path length" herein. In the example of FIG. 6, the "maximum heat diffusion path length" is greater than 15 mm because there is some storage material (namely the storage material at 19) for which the heat diffusion path length is greater than 15 mm.

Heat diffusion path lengths translate into heat diffusion times. Thus, the smaller is the maximum heat diffusion path length, the shorter is the delay between the supply of heat and the corresponding release of ammonia. Consequently, in a purely feedback-controlled system, one would tend to adopt a design with a small maximum heat diffusion path length, significantly smaller than 15 mm. Since a fast response of the ammonia release is not a disadvantage in a feed-forward controlled system, either, in some of the embodiments of the present invention a maximum heat diffusion path length below 15 mm is chosen.

However, it has been recognised that based on a feed-forward control of the heat supply one can better cope with such delays. Thus, in some embodiments, the maximum heat diffusion path length is greater than 15 mm, e.g. up to 100 mm or beyond. Such a system has a less complicated internal structure of fins and is thus be more interesting from an industrial applicability point-of-view.

Figure 7:
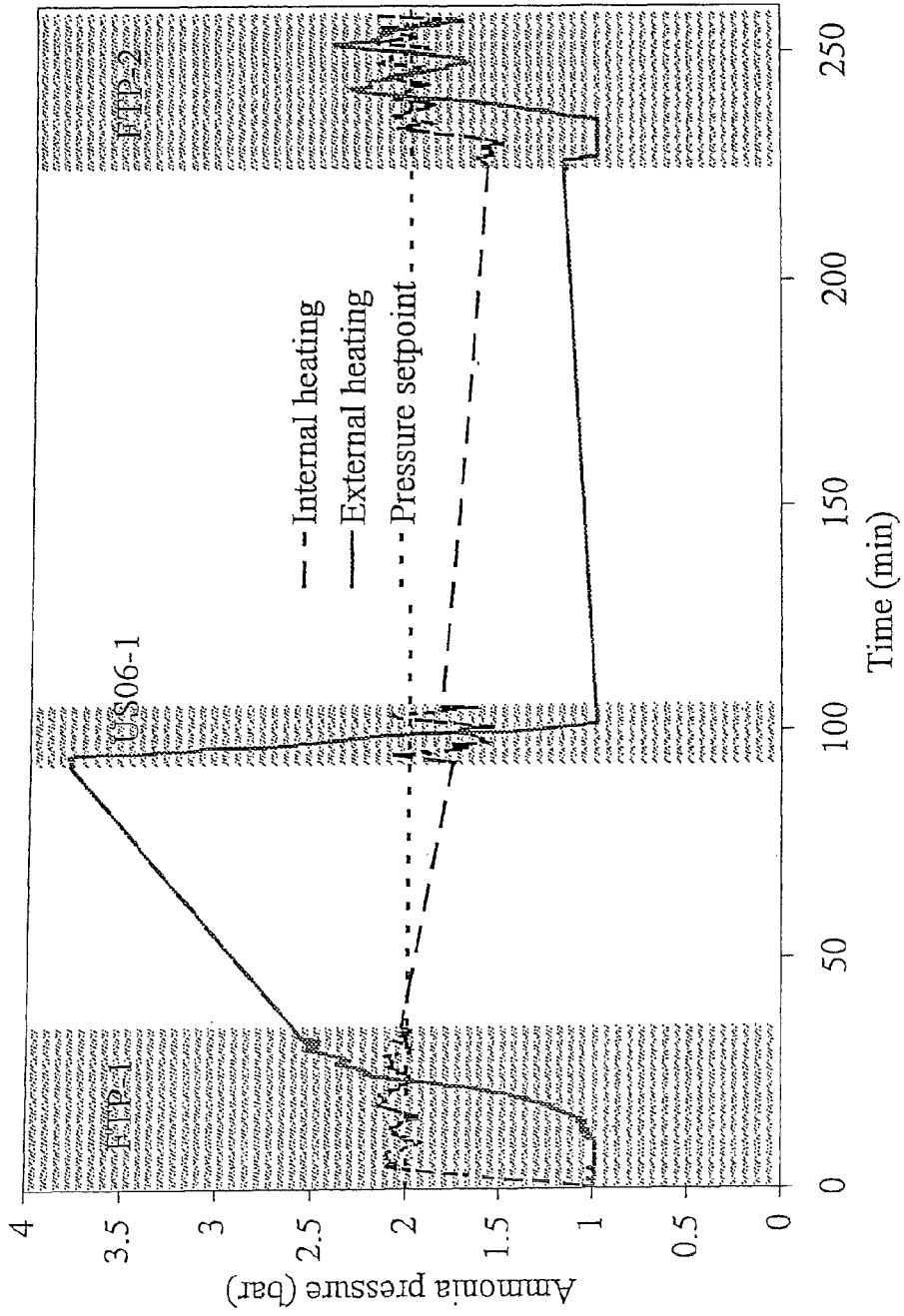
FIG. 7 illustrates by experimental data the reduced delay effects (fast response time, enhanced controllability of the pressure of desorbed ammonia) of an internal embedded heating source compared with an external heating source.

FIG. 7 shows delays due to heat conduction in two different experiments that are only based on feedback control of the heat supply. In both experiments ammonia dosing according to three consecutive driving cycles with intermediate parking was carried out. Two different types of federally approved driving cycles are used: FTP-75 and US-06 (the latter includes more high-speed driving). The driving cycles simulate certain driving conditions. They are characterized by a definition of the vehicle speed as a function of time. When this speed curve is differentiated, one can get a dynamic curve showing where a car would produce much NOx (during acceleration) and thus need larger dosing rates of ammonia.

The experiment starts from a cold unit (room temperature) at t=0. Then a given amount of power is applied to the heating element to reach an ammonia pressure of approximately 2 bars in the buffer. The testing cycle consist of one FTP-75, a "parking period" of 1 hour, a US06 driving cycle, 2 hours of "parking" and finally again one FTP-75 cycle.

One setup consists of:
EXTERNAL HEATING: 2 kg storage material $(Mg(NH_3)_6Cl_2)$ in a container, external heating element (800 W maximum) wrapped around the container, insulation material around the heated container, buffer, pressure sensor, dosing valve (mass flow controller) and a feed-back control using the pressure as feed-back measurement, i.e. heating is applied when the pressure is below the set-point and less (or no) heat is applied when the pressure is above the set-point. The pressure set-point of the feedback control above which the heating source is switched off is 2 bars.

INTERNAL HEATING: 2 kg storage material in a container, as above, but with internal embedded heating element (500 W maximum), insulation around the container, buffer, pressure sensor, and dosing valve (mass flow controller). The pressure set-point of the feedback control above which the heating source is switched off is 2 bars.

Both systems are equally insulated by 3 cm Rockwool.

Looking at the solid curve (EXTERNAL HEATING), this shows the pressure a function of time during the entire experiment when the experiment is carried out using an EXTERNAL heating element (as one traditionally would do). It is easy to see that it takes more than 10 minutes to reach a suitable buffer pressure and when it is finally reached, the thermal inertia of the system causes a dramatic over-shoot of up to 4 bars (also during parking). The next driving cycle starts with a high pressure because the over-shoot from the first cycle is not "reduced". But the next cycle, the feedback control is unable to avoid a large under-shoot in pressure (well below the set point) and a too low pressure makes it impossible to dose the right amount of ammonia. The last cycle is seen to have large oscillations in pressure and also the first period of approximate 10 minutes where the pressure is far too low.

The curve using INTERNAL HEATING is dashed and it can be seen that even using lower power (as the internal heating rod has a lower maximum power level) one can reach the desired pressure after cold start much faster. The starting period is only 100-120 seconds as opposed to more than 10 minutes using EXTERNAL HEATING. Also, in the remaining period of the experiment, it can be seen that the pressure is quite stable around the 2 bar set-point. Thus, is it demonstrated that rapid start and a more stable system is obtained using the current invention. The total power demand during these three cycles is less as shown below (measured in watt hours) for the entire 3-cycle experiment:
INTERNAL: 203 W-h
EXTERNAL: 379 W-h Consequently, using the INTERNAL HEATING, the system performs better while at the same time reducing the power demand by (379−203)/379%=46%. Embodiments described herein (with feed-forward control), for example, use an internal embedded heating of this type.

Figure 8:
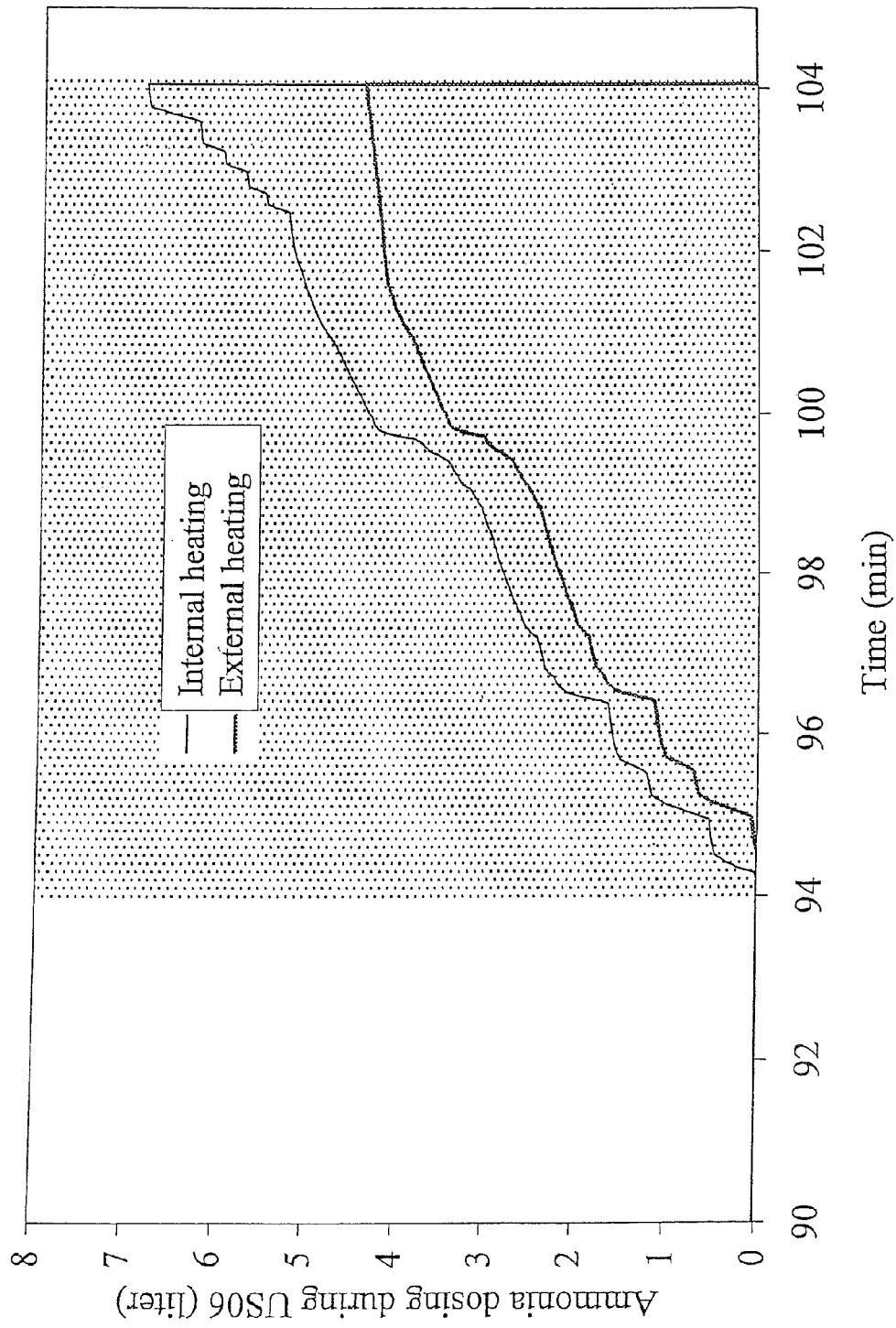
FIGS. 8 and 9 illustrate by experimental data the dosing ability of an internal embedded heating source compared with an external heating source.

FIG. 8 shows the accumulated ammonia dosed during the second driving cycle of FIG. 5 (from 94-104 minutes). This is a US-06 driving cycle and the assumed ammonia demand amounts to an integral need of approximately 7 liters of ammonia demand amounts to an integral need of approximately 7 liters of ammonia gas to be dosed. The figure shows the difference in dosing ability using the INTERNAL vs. EXTERNAL heating.

Any increase in the vertical distance between the two curves means that the system using EXTERNAL heating cannot follow the demand of ammonia defined by the assumed driving cycle. Especially in the last 4 minutes of the cycle, almost no increase in the accumulated ammonia dosing curve is seen. The EXTERNAL heating delivers less than five out of the seven liters needed. The INTERNAL heating follows the driving cycle. Once again with regard to FIG. 5, the US06 cycle (taking place approximately around t=100 minutes) for EXTERNAL is seen to have a low pressure in the last part of the cycle. Thus corresponds to the severe lack of dosing in FIG. 6.

Figure 9:
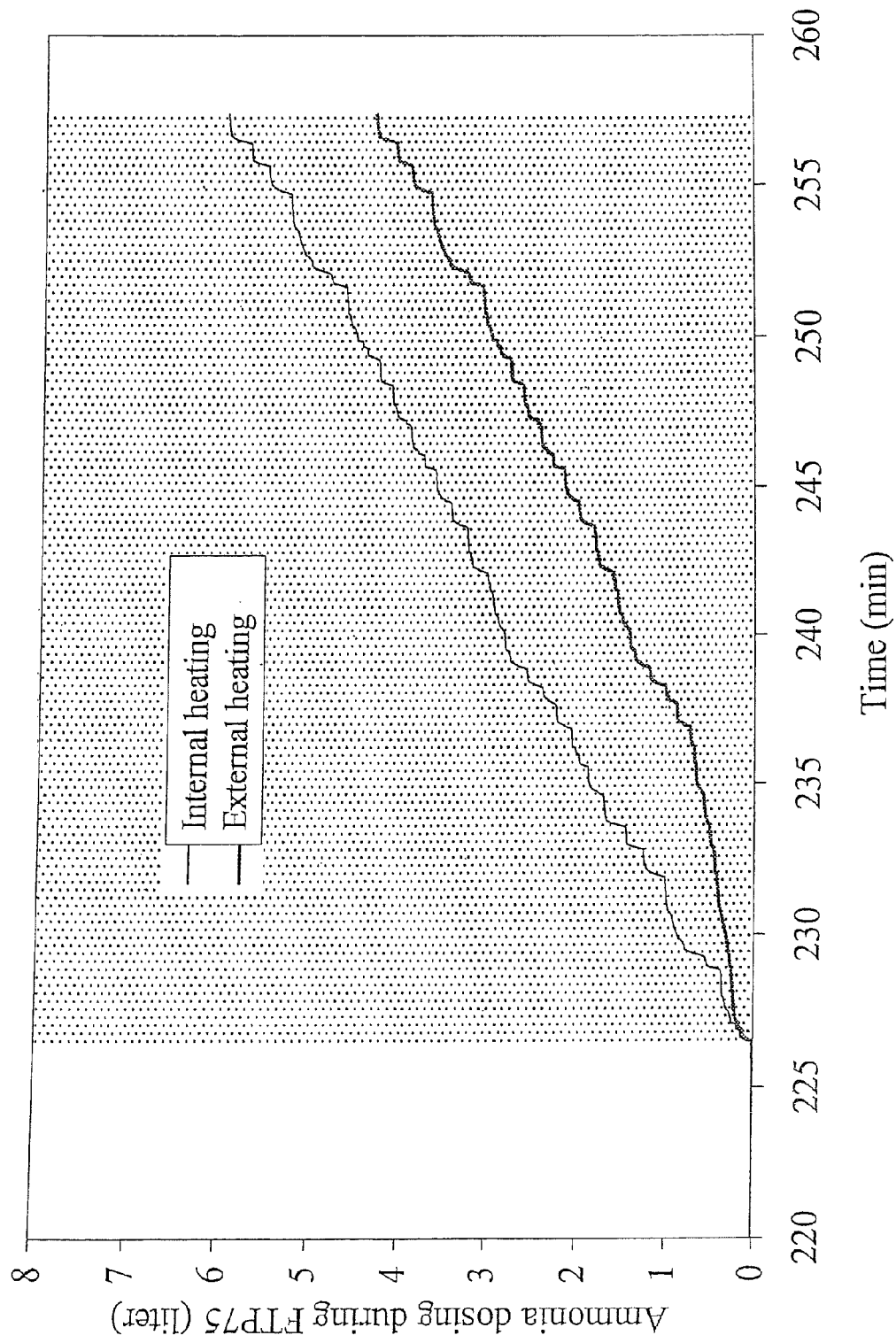

FIG. 9 shows the dosing curve for the final FTP-75 cycle in the experiment (t=226 to t=257 minutes). Here, the EXTERNAL heating system only manages to dose approximately four out of six liters of needed ammonia gas. Here it can be seen that it is mainly in the first part of the cycle that is difficult to follow. This is also seen in FIG. 5 where the pressure curve for EXTERNAL heating is very low in the first 5-10 minutes. INTERNAL heating is able to deliver the desired amount of ammonia.

Figure 10:
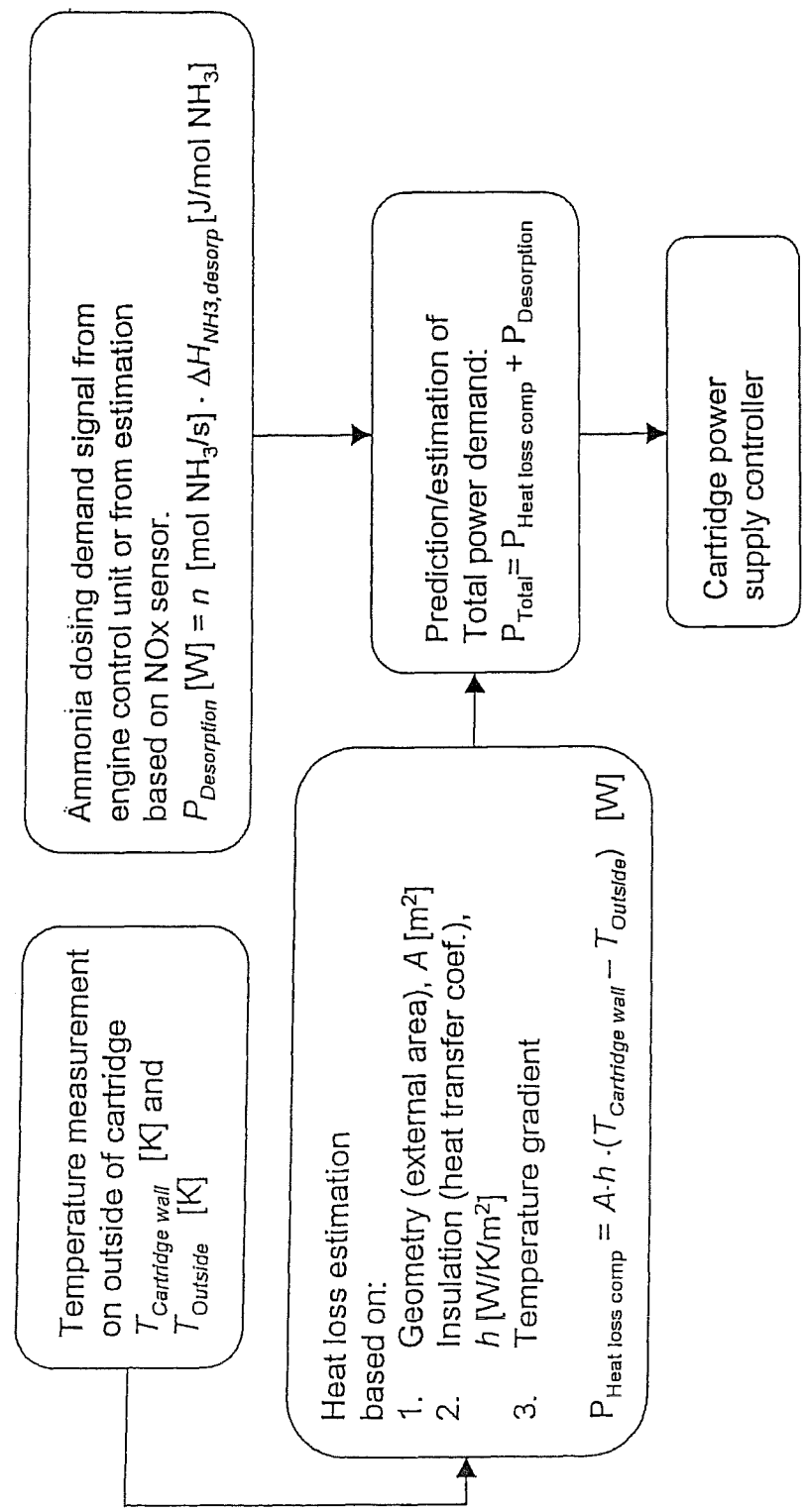
FIG. 10 illustrates the feed-forward control of the heat supply, including real-time estimation of the power demand of the heating source, based on ammonia demand and observation of temperature.

FIG. 10 illustrates the feed-forward control strategy that further enables the control of a system for large capacity, including (but not limited to) systems with long heat diffusion path length scales of the storage material, e.g. above 15 mm. When the length scales are above 15 mm, the time-delay for heat transfer is substantial, even with internal embedded heating. An aim of a control strategy is to avoid reaching a state of "sub-cooling" created by a large release rates of ammonia, which cools the material since the desorption is endothermic. This cooling effect is created locally—where ammonia is desorbed—but the new supply of heat must reach that desorption "front" in the material and this is potentially far away from the heating source. And when a high ammonia release rate takes place when the pressure is above the set-point, in a conventional feedback control, then that will not cause the conventional feedback system to increase the energy input until it is "too late". Therefore, the feed-forward control algorithm shown in FIG. 10 is advantageous.

Basically, a storage unit needs heat for two things: a) to maintain the temperature of the system without ammonia being desorbed (compensating for heat loss) and b) to supply the necessary amount of heat for ammonia desorption to avoid cooling of the material.

Thus the elements of the control strategy are:
a) calculate the heat power needed to compensate for the energy demand for endothermic ammonia desorption. This is done in real time using an ammonia dosing demand signal received from the engine controller (or derived from an expected-$NO_x$ signal from the engine controller) or derived from an $NO_x$ measurement by an $NO_x$ sensor; once the demand (for example expressed as a rate n, in mol/s) is known, the corresponding desorption power $P_{Desorption}$ can be calculated by: $P_{Desorption}[W]=n[mol\ NH_3/s] \times \Delta H_{NH3,\ desorp}[J/mol\ NH3]$;
b) calculate the heat power necessary for compensating for the heat loss through the insulation material. This is done in real time using suitable input such as temperature gradient, the heat transfer coefficient of the insulation layer and the surface area of insulated system; for example, temperature measurements provide an internal temperature $T_{Cartridge\ wall}$ [K] and an external temperature $T_{Outside}$[K]; the external surface area of the storage container is known to be $A[m^2]$; and the heat transfer coefficient of the container's insulation is known to be $h[W/K/m^2]$; then the power required to compensate the heat loss can be calculated by $P_{Heat\ loss\ comp} = A \times h \times (T_{Cartridge\ wall} - T_{Outside})$ [W];
c) add a) and b) in real time to predict the total power demand $P_{total}$ at: $P_{total} = P_{Heat\ loss\ comp} + P_{Desorption}$;
d) control the heat element so that it supplies the total power demand $P_{total}$.

In more practical terms: if one accelerates the car dramatically, the control system immediately adds more heat to the storage unit even if the pressure is actually slightly above where the set-point would be in a conventional feedback control. This avoids a short period of ammonia deficiency that would show up in a conventional feedback system.

If the surface area, A, and the heat transfer coefficient, h, of the container are not known a priori, the controller may also comprise an algorithm that estimates the heat-loss parameters during e.g. a period of 10 minutes of system operation. The coupling of the knowledge of amount of heat input and the amount of released ammonia over a specific period of time (e.g. 10 minutes) will enable the controller to estimate the value of A×h (if the temperature gradient is known). It will not be able to estimate the value of two parameters, A and h, independently but the description of the heat loss as a function of temperature gradient will generally be sufficient if the value of A×h is known.

Figure 11:
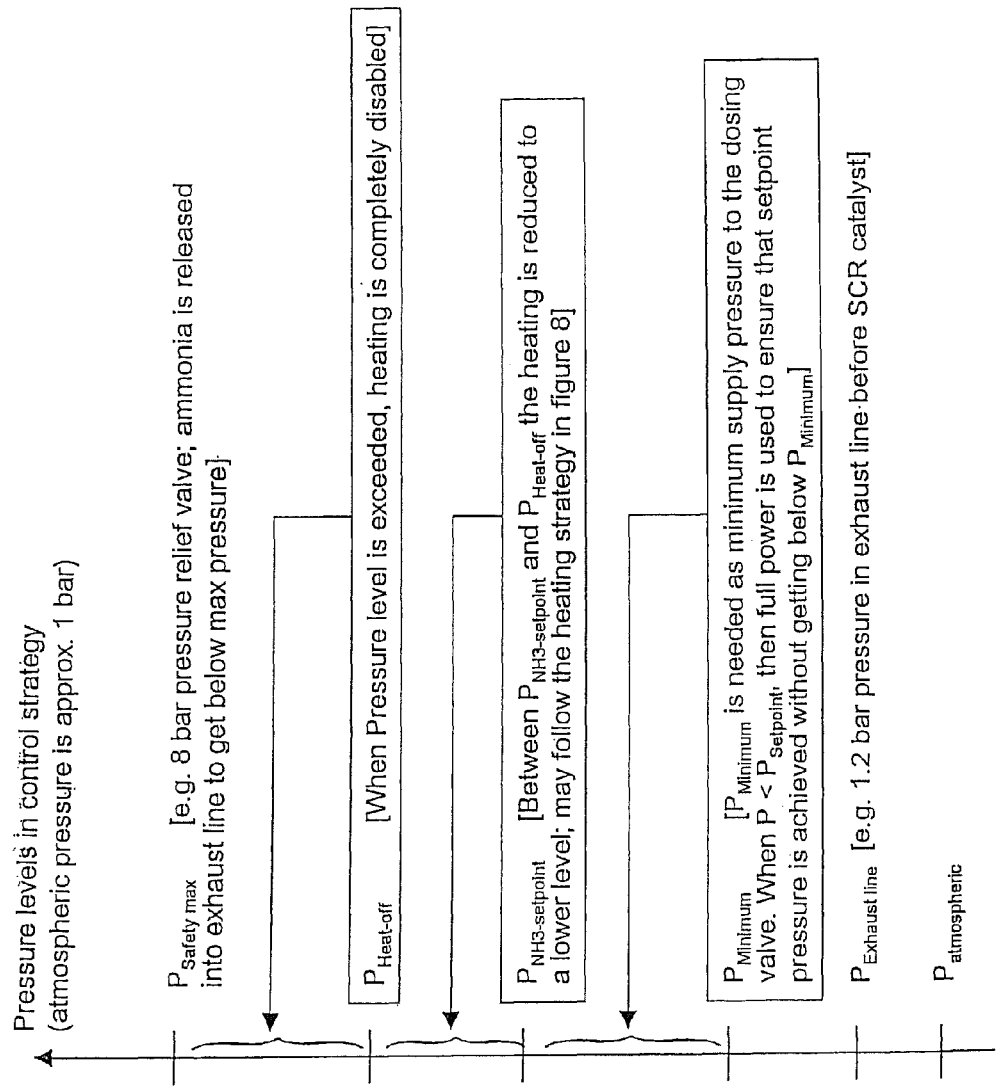
FIG. 11 illustrates the feed forward-control of the heat supply with an overlaid feedback control, based on measured pressure in the storage unit.

FIG. 11 shows an overlaid feedback control to provide an additional safety feature of the control system. The pressure scale shown indicates different pressure levels in the pressure control strategy.

The basis pressure is the atmospheric pressure of the surroundings. The pressure in the exhaust line is slightly higher, e.g. $P_{Exhaust\ line}$=1.2 bar. Dosing of ammonia is not possible unless the dosing valve gets a certain supply pressure from the buffer of $P_{Minimum}$ (as an example say 1.5 bars). The normal set-point is $P_{NH3,\ setpoint}$ (e.g. 1.8 bars). The control strategy presented in FIG. 8 might only be active in the pressure range between $P_{NH3,\ setpoint}$ and $P_{Heat\text{-}off}$ (e.g. 2.2 bars). Above a certain pressure ($P_{Heat\text{-}off}$), the heat is turned off at any rate as a safety feature. $P_{Heat\text{-}off}$ is higher than the set-point in a conventional feedback control would be, since it is a safety feature, but the "normal" control is performed by the feed-forward part. At $P_{Safety\ max}$ an optional pressure relief valve will open to avoid any pressure above a mechanical design level.

When the pressure is below $P_{NH3,\ set\ point}$, then maximum heating should be applied (unless the car is not able to deliver that much power in the current state of engine load). $P_{NH3,\ set\ point}$ is lower than the set-point in a conventional feedback control would be, since also this is a safety feature, but the "normal" control is performed by the feed-forward part.

Figure 12:
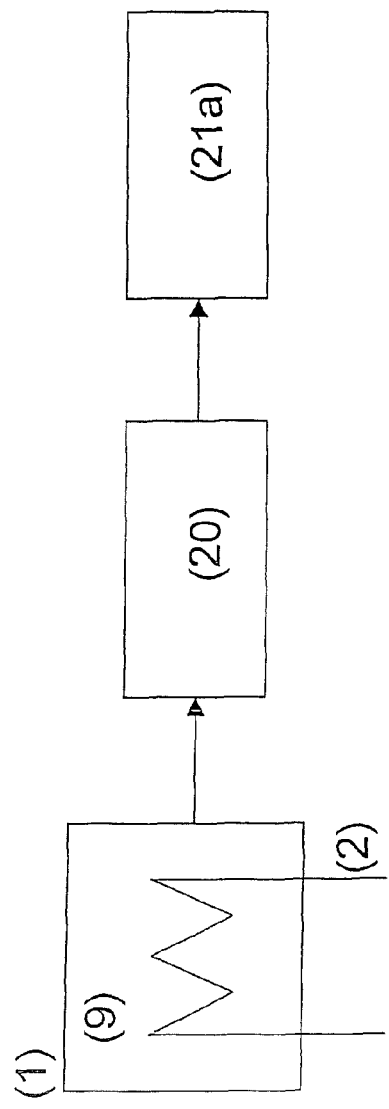
FIGS. 12 and 13 illustrate other embodiments in which the released ammonia is not used to reduce $NO_x$, but serves as a fuel for fuel cells.
Figure 13:
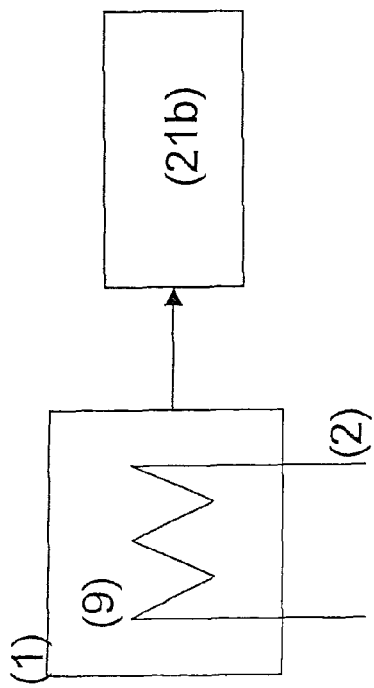

FIGS. 12 and 13 illustrate other embodiments in which the released ammonia is not used to reduce $NO_x$, but serves as fuel for fuel cells. In the embodiment of FIG. 12, ammonia stored in a container (1) in storage material (9) is released by a heater (2) based on a feedforward control of the heat supplied, as explained in illustrated in three previous figures. The released ammonia is supplied to a catalytic cracker (20); the produced hydrogen is fed to a fuel cell (21a) capable of converting hydrogen to electricity. In the embodiment of FIG. 13 the released ammonia is directly supplied to a fuel cell (21b) capable of directly converting ammonia to electricity.

The feed-forward control strategy of FIG. 10, with an optional combination with the pressure level strategy of FIG. 11, constitutes a control strategy that can handle the long time-delays of operating combined with a safe ammonia storage system using endothermic ammonia desorption from storage units with large material length scales above 15 mm. The strategy of FIGS. 10 and 11 is well-suited for the concept of internal heating as the heat-compensating term is easier to compute. One reason is that while the temperature of the internal heating element will typically fluctuate quite substantially, the temperature of the container wall will almost be constant over longer periods of time—and therefore the temperature gradient to the surroundings does not change rapidly. If an external heating was applied, the temperature gradient to the surrounding would change very dynamically because the temperature of the container wall would increase and decrease with every initiation and ending of a heating period.

The invention claimed is:
1. A system for storing ammonia in and releasing ammonia from a storage material capable of binding and releasing ammonia reversibly by adsorption or absorption for a process with a gradual ammonia demand that can vary over the time, the system being arranged to reduce NOx from an oxygen-containing exhaust gas of a combustion engine or combustion process, comprising:

a container capable of housing the ammonia-containing storage material;

a feed line arranged to feed released gaseous ammonia from the container into the exhaust gas, a catalyst for reducing NOx by reaction with the ammonia from the exhaust gas, a controllable dosing valve arranged in the feed line to dose ammonia according to the ammonia demand, the controllable dosing valve system being arranged to dose ammonia released from the ammonia-containing storage material into the exhaust gas, a heating source arranged to supply heat for the desorption of ammonia from the storage material;

a controller arranged to control the heating source to release ammonia, and arranged to control the controllable dosing valve such that it doses the released ammonia into the exhaust gas according to the ammonia demand;

wherein the controller comprises a feed-forward control arranged to control both the heat supplied by the heating source and the controllable dosing valve, based on the ammonia demand; and wherein the controller is arranged to determine a heat loss of the container to the surroundings, and the feed-forward control is arranged to control the heat supplied by the heating source such that it compensates the heat loss to the surroundings.

2. The system of claim 1, wherein the desorption of ammonia from the storage material is endothermic, and the feed-forward control is arranged to control the heat supplied by the heating source such that it compensates the energy required for the endothermic desorption of the demanded ammonia from the storage material.

3. The system of claim 1, wherein the heat loss to the surroundings is estimated on the basis of a measurement of at least one of the temperature inside the container, the temperature of an inner side of a container wall, the temperature of an outer side of a container wall, and the temperature of the surroundings.

4. The system of claim 1, wherein the controller comprises an over-laid feedback control arranged, based on a pressure measurement in the container, to reduce or terminate the supply of heat by the heating source when the pressure is above an upper pressure threshold and to increase or start the supply of heat by the heating source when the pressure is below a lower pressure threshold.

5. The system of claim 1, wherein the controller is further arranged to obtain the ammonia demand based on at least one of (i) a measurement of the NOx, and (ii) information from an engine controller or combustion process controller.

6. The system of claim 5, further comprising an NOx sensor, on which an NOx measurement is based.

7. The system of claim 5, wherein the information from the engine controller is indicative of the engine's operational state, and the feed-forward control is arranged to estimate the ammonia demand based on the operational state information.

8. The system of claim 1, wherein the ammonia storage material is capable of binding and releasing ammonia reversibly by absorption and is a chemical complex in the form of an ionic salt of the general formula: $M_a(NH_3)_nX_z1$ wherein M is one or more cations selected from alkali metals, alkaline earth metals, and transition metals or combinations thereof, X is one or more anions selected from fluoride, chloride, bromide, iodide, nitrate, thiocyanate, sulphate, molybdate and phosphate ions, a is the number of cations per salt molecule, z is the number of anions per salt molecule, and n is the coordination number of 2 to 12.

9. The system of claim 8, wherein the ionic salt is either chloride or sulphate salts of Mg, Ca, Sr or mixtures thereof.

10. The system of claim 1, wherein the ammonia storage material is in the form of shaped units of ammonia storage material.

11. The system of claim 10, wherein the ammonia storage material is compacted to a dense block, rod, cylinder ring or edged unit with a density above 70% of the theoretical maximum skeleton density of the saturated solid material.

12. The system of claim 1, wherein control of the controllable dosing valve comprises a mass flow meter that is arranged to measure the mass flow of ammonia dosed by the dosing valve.

13. The system of claim 12, arranged to compare the ammonia demand and the measured mass flow, and control the controllable dosing valve such that the measured mass flow matches the ammonia demand.

14. The system of claim 1, wherein the heating source is arranged inside the container and is surrounded by ammonia storage material.

15. A method of releasing ammonia stored by storage material housed in a container and capable of binding and releasing ammonia reversibly by adsorption or absorption for a process with a gradual ammonia demand that can vary over the time to reduce NOx from an oxygen-containing exhaust gas of a combustion engine or combustion process, comprising:

determining how much heat is to be supplied to the ammonia storage material for the desorption of ammonia based on the ammonia demand;

supplying the heat by a heating source;

dosing released ammonia through a feed line from the container into the exhaust gas by means of controllable dosing valve according to the ammonia demand, the controllable dosing valve being arranged to dose ammonia released from the containing storage material into the exhaust gas wherein both the heat supplied by the heating source and the controllable dosing valve system are controlled by feed-forward control based on the ammonia demand; and further determining a heat loss of the container to the surroundings wherein the feed-forward control controls the heat supplied by the heating source such that it compensates the heat loss from the container to the surroundings.

16. The method of claim 15, wherein the heating source is arranged inside the container and is surrounded by ammonia storage material.

* * * * *

UNITED STATES PATENT AND TRADEMARK OFFICE
CERTIFICATE OF CORRECTION

PATENT NO.        : 9,010,091 B2
APPLICATION NO.   : 13/479402
DATED             : April 21, 2015
INVENTOR(S)       : Tue Johannessen et al.

Page 1 of 1

It is certified that error appears in the above-identified patent and that said Letters Patent is hereby corrected as shown below:

On the title page item (75) 2nd inventor should read

Henning SCHMIDT
Dyssegård, (DK)

Signed and Sealed this
Eighth Day of September, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,010,091 B2 | Page 1 of 1 |
| APPLICATION NO. | : 13/479402 | |
| DATED | : April 21, 2015 | |
| INVENTOR(S) | : Tue Johannessen et al. | |

It is certified that error appears in the above-identified patent and that said Letters Patent is hereby corrected as shown below:

ON THE TITLE PAGE

U.S. Provisional Patent Application No. 60/908,987, filing date of March 30, 2007 and NOT March 30, 2008

Signed and Sealed this
Ninth Day of February, 2016

Michelle K. Lee
*Director of the United States Patent and Trademark Office*